United States Patent
Xie et al.

(10) Patent No.: US 11,082,841 B2
(45) Date of Patent: *Aug. 3, 2021

(54) SECURE PHYSICAL LAYER SLOPE AUTHENTICATION METHOD IN WIRELESS COMMUNICATIONS AND APPARATUS

(71) Applicant: Shenzhen University, Shenzhen (CN)

(72) Inventors: Ning Xie, Shenzhen (CN); Li Zhang, Shenzhen (CN); Hui Wang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 196 days.

This patent is subject to a terminal disclaimer.

(21) Appl. No.: 16/574,143

(22) Filed: Sep. 18, 2019

(65) Prior Publication Data
US 2020/0015082 A1 Jan. 9, 2020

Related U.S. Application Data

(63) Continuation of application No. PCT/CN2017/105068, filed on Sep. 30, 2017.

(51) Int. Cl.
*H04W 12/06* (2021.01)
*G06F 17/18* (2006.01)
(Continued)

(52) U.S. Cl.
CPC ............ *H04W 12/06* (2013.01); *G06F 17/18* (2013.01); *H04L 63/16* (2013.01);
(Continued)

(58) Field of Classification Search
CPC ... H04W 12/06; H04W 12/122; H04W 12/04; H04W 4/008; H04W 4/06; H04W 52/36;
(Continued)

(56) References Cited

U.S. PATENT DOCUMENTS 9,204,374 B2 * 12/2015 Raleigh ................. H04W 12/00
10,110,595 B2 * 10/2018 Choyi ..................... G06F 21/64
(Continued)

FOREIGN PATENT DOCUMENTS

WO   WO-2009032324 A2 * 3/2009 ............... H04L 9/32

OTHER PUBLICATIONS

F. J. Liu, Xianbin Wang and H. Tang, "Robust physical layer authentication using inherent properties of channel impulse response," 2011, MILCOM 2011 Military Communications Conference, pp. 538-542. (Year: 2011).*

(Continued)

*Primary Examiner* — Lana N Le
(74) *Attorney, Agent, or Firm* — Jeffrey Pearce (57) ABSTRACT

A wireless communication method and device include: a transmitting device dividing a to-be-transmitted signal into a plurality of packets by using a pre-agreed key; acquiring a preset equivocation threshold; according to the equivocation threshold, determining a power parameter adjustment factor for each of the packets; for each of the packets, performing power adjustment on a signal of the packet according to a power parameter adjustment factor of the packet; and transmitting the to-be-transmitted signal after power adjustment. After receiving the signal, the receiving device groups the signals according to the pre-agreed key, and calculates the power of each packet; determines a test statistic according to the power of each packet, and determines the test statistic whether the quantity is greater than or equal to a preset statistic threshold. If so, it determines that the signal is a tag signal, and if not, that it is a regular signal.

2 Claims, 6 Drawing Sheets

(51) Int. Cl.
*H04W 12/122* (2021.01)
*H04L 29/06* (2006.01)
*H04W 52/36* (2009.01)
*H04B 1/04* (2006.01)

(52) U.S. Cl.
CPC ......... *H04W 12/122* (2021.01); *H04W 52/36* (2013.01); *H04B 2001/0416* (2013.01)

(58) Field of Classification Search
CPC ............... H04W 52/50; H04W 52/281; H04W 72/0473; H04W 52/367; H04W 88/02; H04W 72/0406; H04W 52/06; H04W 52/146; H04W 52/346; H04W 12/02; H04W 12/40; H04W 4/80; H04W 88/085; H04W 52/34; H04W 12/069; H04W 84/18; H04W 12/106; H04W 8/005; H04W 8/22; H04W 12/0609; H04W 52/241; H04W 52/362; H04W 52/247; H04W 52/20; H04W 80/02; H04L 63/16; H04L 63/08; H04L 63/061; H04L 1/0026; H04L 5/00; H04L 2209/12; H04L 63/123; H04L 9/0861; H04L 9/088; H04L 9/12; H04L 9/3242; H04L 9/3247; H04L 9/08; H04B 2001/0416; H04B 1/707
See application file for complete search history.

(56) References Cited

U.S. PATENT DOCUMENTS

| | | | | |
|---|---|---|---|---|
| 2003/0012372 | A1* | 1/2003 | Cheng | H04L 1/0066 380/28 |
| 2004/0236547 | A1* | 11/2004 | Rappaport | H04W 16/20 703/2 |
| 2005/0213553 | A1* | 9/2005 | Wang | H04W 12/06 455/411 |
| 2006/0183462 | A1* | 8/2006 | Kolehmainen | H04W 12/50 455/411 |
| 2008/0064367 | A1* | 3/2008 | Nath | H04W 12/06 455/411 |
| 2012/0224491 | A1* | 9/2012 | Norair | H04W 52/243 455/411 |
| 2013/0272233 | A1* | 10/2013 | Dinan | H04W 52/362 370/329 |
| 2015/0095648 | A1* | 4/2015 | Nix | H04W 52/0277 713/170 |
| 2016/0087957 | A1* | 3/2016 | Shah | H04W 12/06 726/1 |
| 2016/0100311 | A1* | 4/2016 | Kumar | H04W 12/06 455/411 |
| 2016/0112944 | A1* | 4/2016 | Zhou | H04W 12/06 370/338 |
| 2017/0289118 | A1* | 10/2017 | Khosravi | H04W 12/06 |
| 2019/0174554 | A1* | 6/2019 | Deenoo | H04W 56/001 |
| 2020/0015055 | A1* | 1/2020 | Wilkinson | H04W 4/80 |
| 2020/0015085 | A1* | 1/2020 | Xie | H04W 12/06 |
| 2020/0021586 | A1* | 1/2020 | Schmidt | H04W 12/069 |
| 2020/0169883 | A1* | 5/2020 | Xie | H04W 12/06 |

OTHER PUBLICATIONS

Shrestha, B. "Context-enhanced mobile device authorization and authentication", 2016, ProQuest Dissertations and Theses Professional Publishing, dissertation #10149575, pp. 1-186. Retrieved from https://dialog.proquest.com/professional/docview/1815781040?accountid=131444 (Year: 2016).*

* cited by examiner

SECURE PHYSICAL LAYER SLOPE AUTHENTICATION METHOD IN WIRELESS COMMUNICATIONS AND APPARATUS

CROSS-REFERENCE TO RELATED APPLICATIONS

This application is a "bypass" continuation under 35 U.S.C. § 111(a) of international application (filed under the Patent Cooperation Treaty—PCT) No. PCT/CN2017/105068 filed Sep. 30, 2017, for "Secure Physical Layer Slope Authentication Method in Wireless Communications and Apparatus", which is incorporated herein by reference.

TECHNICAL FIELD

The present disclosure relates to communication devices, and in particular to a wireless communication method and apparatus.

BACKGROUND ART

There are three main physical layer authentication technologies. The first authentication technology is the Spread Spectrum Authentication method (Auth-SS). The basic idea is to use traditional direct-sequence spread spectrum or frequency hopping technology. The second one is based on the Auth-TDM (Authentication with Time Division Multiplexed Tag). The basic idea is that the transmitting device periodically sends information signals and tag information alternately. After receiving the signal, the receiving device directly extracts the desired tag information to implement authentication of the signal. The third authentication technology is the Authentication with Superimposed Tag (Auth-SUP). The basic idea is to use the key to superimpose the tag information on the information signal, and then the transmitting device simultaneously transmits the signal, and after the receiving device receives the signal, the tag information in the superimposed signal is extracted by using the key to achieve the purpose of signal authentication.

The above three physical layer authentication technologies (Auth-TDM, Auth-SS, and Auth-SUP) expose the fact that authentication information is included. Among them, Auth-SS and Auth-TDM technologies are more likely to attract the attention of other users in the scene, especially hostile users, compared to conventional signals that do not contain authentication information. Once the hostile user discovers that the communication system is attempting to communicate and authenticate, it will attack. Common attack models include interference attacks, replay attacks, and spoofing attacks, which threaten the security of information transmission.

DETAILED DESCRIPTION

The technical solutions in the embodiments of the present invention will be clearly and completely described in the following with reference to the accompanying drawings. It is apparent that the described embodiments are only some of the embodiments of the invention, and not all possible embodiments. All other embodiments obtained by those skilled in the art based on the embodiments of the present invention without creative efforts are within the scope of the present invention.

It should be noted that the terms "first" and "second" and the like in the specification and claims of the present invention and the above drawings are used to distinguish different objects, and are not intended to describe a specific order. Furthermore, the terms "comprises" and "comprising" are intended to cover a non-exclusive inclusion. For example, a process, method, system, product, or device that comprises a series of steps or units is not limited to the listed steps or units, but optionally also includes steps or units not listed, or, other steps or units optionally inherent to these processes, methods, products or equipment.

The disclosure discloses a wireless communication method and device, which can improve the security of information transmission. The details are described below.

Figure 1:
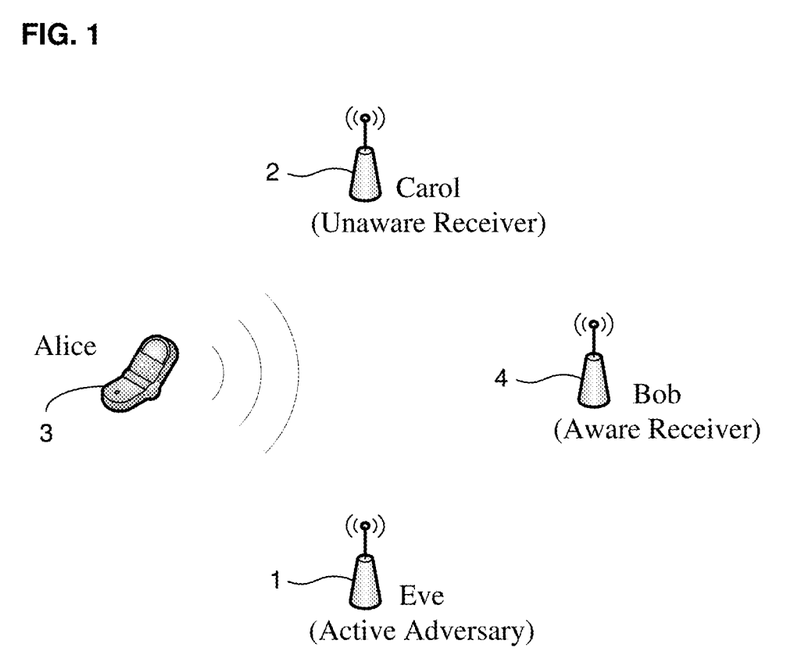
FIG. 1 is a schematic structural diagram of a communication system according to some embodiments.

Please refer to FIG. 1. FIG. 1 is a schematic diagram of a model of a communication system according to an embodiment. As shown in FIG. 1, the communication system may include a transmitting device 3 (shown as Alice), a receiving device 4 (shown as Bob), an actively adversarial audio monitor device 1 (shown as Eve) and an unaware audio monitor device 2 (Carol).

The transmitting device 3 (Alice) is authorized and is mainly used for transmitting a label signal that needs to be authenticated. A signal with a label is added is called a label signal, and a signal without the label is called a regular signal. The transmitting device may include, but is not limited to, a base station and user equipment. A base station (e.g., an access point) may refer to a device in an access network that communicates with a wireless terminal by one or more sectors over an air interface. The base station may convert received air frames to the IP packet as a router between the wireless terminal and the rest of the access network, wherein the remainder of the access network may include an Internet Protocol (IP) network. The base station may also coordinate attribute management of the air interface. For example, the base station may be a GSM or CDMA base station (BTS, Base Transceiver Station) in, or may be a WCDMA base station (NodeB), or may be a LTE evolved base station (NodeB or eNB or e-NodeB, evolutional Node B). The user equipment may include, but is not limited to, a smart phone, a notebook computer, a personal computer (PC), a personal digital assistant (PDA), a mobile internet device (MID), a wearable device (such as a smart watch).

Various types of electronic devices, such as smart bracelets and smart glasses, wherein the operating system of the user device may include, but is not limited to, an Android operating system, an IOS operating system, a Symbian operating system, a BlackBerry operating system and Windows Phone 8 operating system and so on are not limited in the embodiment of the present disclosure.

The receiving device 4 (Bob) is an authorized device, mainly used to receive signals, and the signal is authenticated to determine whether the signal is a regular signal or a tag signal. The receiving device may include, but is not limited to, a base station and a user equipment. A base station (e.g., an access point) may refer to a device in an access network that communicates with a wireless terminal over one or more sectors over an air interface. The base station may be used to convert the received air frames to the IP packet as a router between the wireless terminal and the rest of the access network, wherein the remainder of the access network may include an Internet Protocol (IP) network. The base station may also coordinate attribute management of the air interface. For example, the base station may be a GSM or CDMA base station (BTS, Base Transceiver Station), or may be a WCDMA base station (NodeB), or may be an evolved LTE base station (NodeB or eNB or e-NodeB, evolutional Node B), the embodiment of the present disclosure is not limited. The user equipment may include, but is not limited to, a smart phone, a notebook computer, a personal computer (PC), a personal digital assistant (PDA), a mobile internet device (MID), a wearable device (such as a smart watch). Various types of electronic devices, such as smart bracelets and smart glasses, wherein the operating system of the user device may include, but is not limited to an Android operating system, an IOS operating system, a Symbian operating system, and a BlackBerry operating system, the Windows Phone 8 operating system and so on are not limited in the embodiment of the present disclosure.

The monitoring device 1 (Eve) is an unauthorized receiving party (i.e., a hostile user), and is mainly used for monitoring signals sent by the transmitting device. Once the signal sent by the transmitting device is found to contain authentication information (i.e., a tag signal), the signal will be analyzed, and the hostile user will try to extract, destroy, and even tamper with the authentication information.

The monitoring device 2 (Carol) is a relatively neutral receiver, and may receive the signal transmitted by the transmitting device 3, but it has no idea of the authentication method, and does not attempt to analyze whether the received signal contains the authentication information. It does not interfere with the signal received by the receiving device, and does not affect the authentication process of the signal by the receiving device.

It should be noted that the transmitting device 3, the receiving device 4, the monitoring device 1 and the monitoring device 2 in the communication system described in FIG. 1 may all represent different groups of devices. That is, the number of the transmitting devices in the communication system is not limited to one, and the number of the receiving devices in the communication system described in FIG. 1 is not limited to one. Similarly, the number of the monitoring devices 1 in the communication system described in FIG. 1 is not limited to only one, and the number of the monitoring devices 2 in the communication system described in FIG. 1 is not limited to one.

In the communication system described in FIG. 1, it is assumed that the signal transmitted by the transmitting device is transmitted in blocks, expressed as b={$b_1$, K, $b_L$}, the length of each block is L, and the signal block and the signal block are independent and identically distributed random variables. Furthermore, the channels between different devices are modeled as fast-fading channels, which means that the channel fading corresponding to different signal blocks is also independent. Based on the above assumptions, the signal received by the receiving device may be expressed as follows:

$$y_i = h_i x_i + n_i \tag{1.1}$$

where the original transmission signal code sequence b={$b_1$, K, $b_L$}, is operated, by code modulation, pulse shaping, and so on, to get $s_i$, and then the label signal is added to $s_i$, to get $x_i$. that is, $x_i$ contains the label signal and the information signal, $h_i = l_i \eta_i$ is the channel response. In the present disclosure, we use the Nakagami channel, $\eta_i$, to represent a random variable of short-term fading, $l_i = \lambda/4\pi d$ is the path loss, $\lambda = c/f_c$ is the signal wavelength, $c = 3 \times 10^8$ m/s, $f_c$ is the carrier frequency of the signal, and d is the distance between transmitting device and receiving device, $n_i = n_{i1}, n_{i2}, \ldots, n_{iL}, n_{ik} \sim CN(0, \sigma^2_n)$ is Gaussian white noise.

Specifically, the transmitting end device 3 may divide the signal to be sent into multiple packets by using a pre-agreed key, and further obtain a preset threshold of the equivocation; at the same time, the transmitting device may obtain the power parameter adjustment factor of each packet according to the equivocation threshold. For each packet, according to the power parameter adjustment factor of the packet, the signal of the packet is power-adjusted, and the signal to be transmitted after the power adjustment is transmitted. After receiving the signal, the receiving device 4 may determine the power allocation feature of the signal according to the pre-agreed key to determine the test statistic, and further determine whether the check statistic is greater than or equal to a preset statistic threshold. If so, it is determined that the signal is a tag signal, and if not, the signal is determined to be a regular signal. The tag signal is an authentication signal received by the receiving end device, and the regular signal is a non-authentication signal received by the receiving end device. The receiving device knows the label signal and the encryption mode added by the transmitting device, and agrees with the transmitting device to use the used key in advance. The above-summarized physical layer authentication arrangement may be referred to as slope authentication technology (Auth-SLO).

It may be seen that before transmitting the to-be-sent signal, the transmitting device 3 uses the key agreed upon by the two parties to group the transmitted signals, and uses the determined power parameter adjustment factor to allocate and adjust the power of each group of signals. At the same time, the receiving device may also use the key agreed upon by the two parties to identify whether the received signal satisfies the power allocation feature of the signal transmitted by the transmitting device to achieve the purpose of information authentication. During the entire information transmission process, the hostile user 1 does not obtain the location information of the power modification, thereby improving the security of the information transmission.

Figure 2:
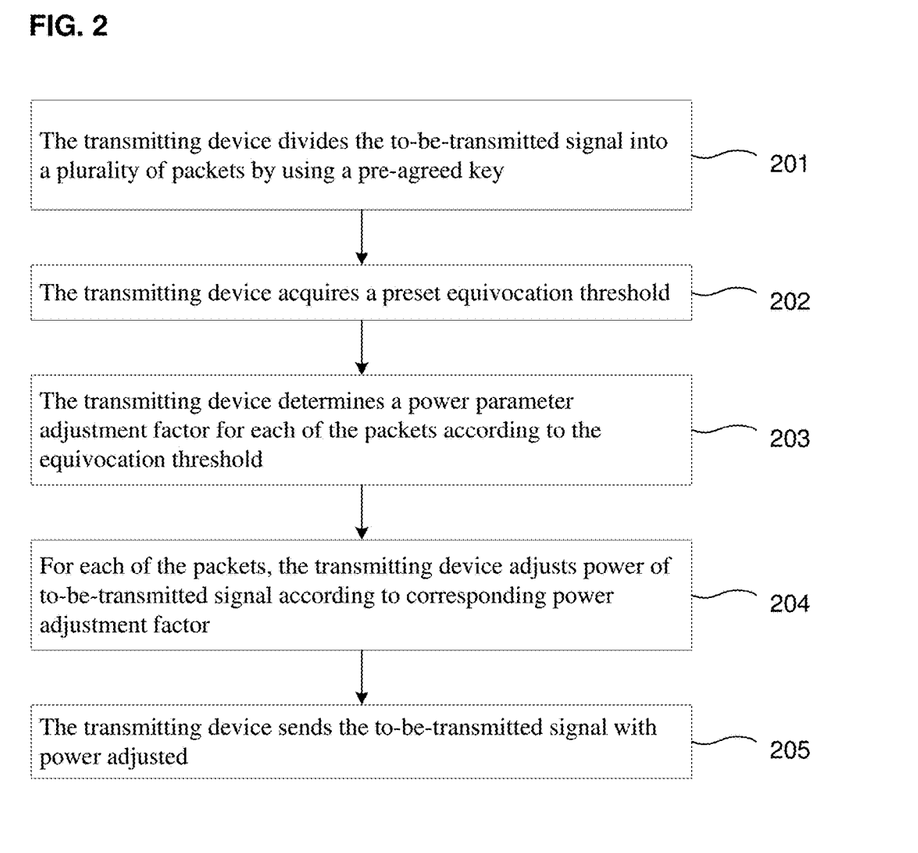
FIG. 2 is a schematic flowchart of a wireless communication method according to some embodiments.

The wireless communication method may be applicable to a transmitting device. As shown in FIG. 2, the wireless communication method may include the following steps:

In step 201, the transmitting device divides the to-be-transmitted signal into a plurality of packets by using a pre-agreed key.

In one embodiment, before transmitting the to-be-transmitted signal, the transmitting device may divide the signal to be transmitted into multiple packets by using a pre-agreed key, where the number of specific packets and the length of each group of signals may be determined by a key that is pre-agreed upon and known by the receiving device and transmitting device.

For example, a N length string of information signal and a N length string of keys may be provided, wherein N is a positive integer. The number of 0s and is in the key may be the same. The information signal may be aligned with the key by the transmitting device, the bits in the information signal corresponding to 0 of the key may be divided into a first group, and the bits in the information signal corresponding to 1 of the key may be divided into a second group. That is, the information signal could be divided into two groups. For the sake of simplicity, the following description refers to only two groups.

It should be noted that the transmitting device and the receiving device could establish a relationship between an equivocation and a power parameter adjusting factor through multiple communications. Each time before sending the signal, the transmitting device may receive a feedback information sent by receiving device. The feedback information may be used to indicate the relationship between the equivocation threshold and the power parameter adjustment factor.

In step 202, the transmitting device acquires a preset equivocation threshold, which may refer to an entropy of a power modification position for all received signals. In the embodiment, in order to accurately reflect whether a power modification position is found by the monitoring device 1, a threshold of equivocation may be preset.

It is assumed that the monitoring device 1 may attempt to find the power modification position. The monitoring device 1 may first estimate a channel response $h_i$ and then obtain a residual signal by removing the information signal therefrom $y_i$. According to the slope authentication technology Auth-SLO algorithm described above, the residual signal may be expressed as:

$$y_k = (1-\beta) + \frac{h_i^* n_i}{\|h_i\|^2}, \quad (1.1)$$

The corresponding signal to noise ratio SNR is expressed as:

$$\gamma_k = \frac{(1-\beta)^2}{\sigma_n^2/\|h_i\|^2} = (1-\beta)^2 \gamma_i. \quad (1.2)$$

The monitoring device 1 may determine a value of $1-\beta$ by performing a symbol check on $y_k$. A bit error rate may be simply expressed as:

$$p_e = \Phi(-\sqrt{\gamma_k}) \quad (1.3)$$

The equivocation threshold may then be expressed by binary entropy as:

$$H(1-\beta|y_k) = p_e \log_2 \frac{1}{p_e} + (1-p_e)\log_2 \frac{1}{(1-p_e)}. \quad (1.4)$$

As may be seen from the above formulas, the equivocation threshold is related to only two parameters, $\beta$ and $\gamma_i$. When the equivocation threshold is 1, the power modification position may not obtained.

Therefore, the transmitting device may determine the equivocation threshold according to a condition that the power modification position may not be obtained, for example, the equivocation threshold is 1.

Specifically, the transmitting device and the receiving device might obtain the relationship between the equivocation threshold and the power parameter adjustment factor in a training phase, and might determine the equivocation threshold by the location according to a degree of the power modification position that could be obtained and security requirements of an actual communication scenario.

In step 203, the transmitting device determines a power parameter adjustment factor for each of the packets according to the equivocation threshold.

In one embodiment, the step 203 may include: the transmitting device determines a first power parameter adjustment factor for one packet according to the equivocation threshold; and the transmitting device determines power parameter adjustment factors for the other packets according to the first power parameter adjustment factor and the energy-limited condition of the to-be-transmitted signal power.

In one embodiment, first, the preset equivocation threshold may be determined in advance according to a condition that the power-modified location information could not be obtained. Second, the first power parameter adjustment factor may be determined according to the equivocation threshold. For example, the first power parameter adjustment factor may equal 0.9, that is $\beta=0.9$. Third, the other power parameter adjustment factor, that is, a second power parameter adjustment factor $\alpha$, could be determined according to the first power parameter adjustment factor and an energy-limited condition of the to-be-transmitted signal power. The power parameter adjustment factors of the to-be-transmitted signal need to meet the energy-limited condition, for example, $\alpha^2/2+\beta^2/2=1$, according to the principle that the total energy of the signal would not change before and after the power parameter adjustment.

If the number of the packets is equal to or greater than (n+2), where n is a positive integer, except for a last power parameter adjustment factor, the other power parameter adjustment factors may be determined first according to the equivocation threshold. Then the last power parameter adjustment factor may be determined according to the principle that the total energy of the signal should not change before and after the power parameter adjustment.

Figure 3:
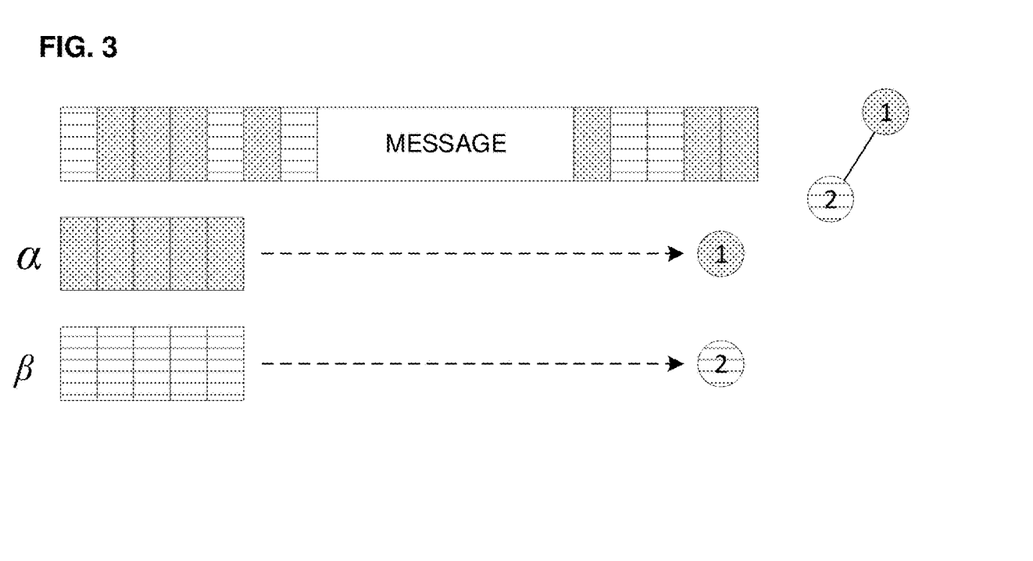
FIG. 3 is a schematic diagram of a power allocation mechanism of a signal according to some embodiments.

Step 204: For each of the packets, the transmitting device adjusts the power of to-be-transmitted signal according to the corresponding power parameter adjustment factor. Please refer to FIG. 3 together. FIG. 3 is a schematic diagram of a power distribution mechanism of a signal according to an embodiment. As shown in FIG. 3, the signal is divided into two packets, that is, the first packet and the second packet. The transmitting device may multiply the signal power of the first packet by the power parameter adjustment factor $\alpha$ and multiply the signal power of the second packet by the power parameter adjustment factor $\beta$ to adjust signal power for each packet. Among them, need to meet the condition $0 \leq \beta < 1 < \alpha$. The two tag signals may be expressed as follows:

$$x_{i,1}(l_1) = \alpha s_i(l_1)$$

$$x_{i,2}(l_2) = \beta s_i(l_2). \quad (1.5)$$

where $l_1 \neq l_2 \in \{1, \ldots, L/2\}$ represents the subscript of each packet. The length of signals in packets $x_{i,1}$ and $x_{i,2}$ are both $L/2$. $\alpha$ and $\beta$ also need to satisfy the energy-limited condition of the signal power, that is, $\alpha^2/2+\beta^2/2=1$, so the ranges $\alpha$ and $\beta$ may be further changed to $0 \leq \beta < 1 < \sqrt{2}$.

In Step 205, the transmitting device sends the to-be-transmitted signal with power adjusted.

In the embodiment, after the transmitter device performs power adjustment on each packet, a certain power allocation feature may be formed, and the to-be-transmitted signal with power adjusted is sent to the receiving device. The power allocation feature may include: a tag signal, a power parameter adjustment factor, and a packet mode (i.e., which locations are selected).

In the method flow described in FIG. 2, before transmitting the to-be-transmitted signal, the transmitting device may use the key agreed by the two parties to divide the transmitted signals into multiple packets, and use the determined power parameter adjustment factor to adjust the signal power of each packets. Then, the signal is transmitted, and the hostile user 1 cannot obtain the position information of the power modification during the whole information transmission; thereby, the security of the information transmission may be improved.

Figure 4:
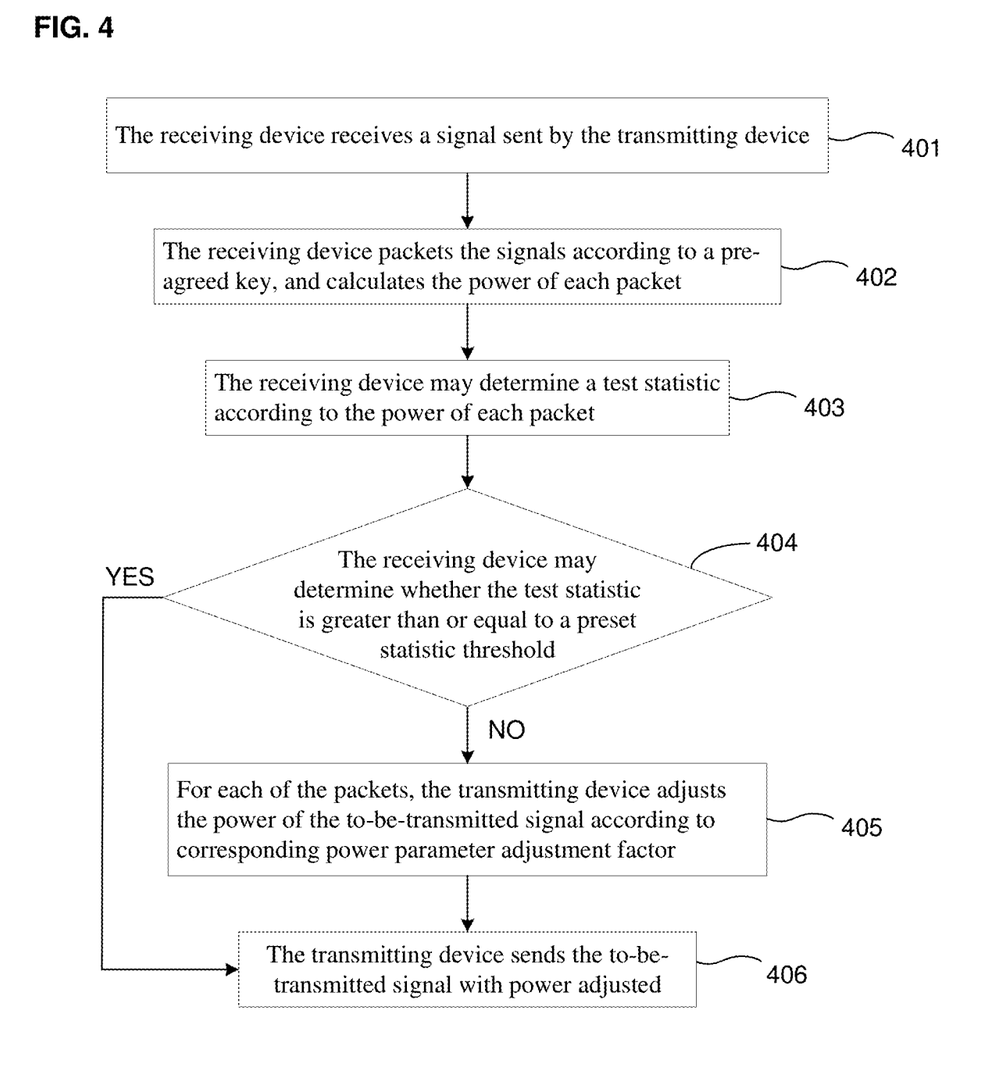
FIG. 4 is a schematic flowchart of a wireless communication method according to some embodiment of the present invention.

The wireless communication method may be applicable to a receiving device as well. As shown in FIG. 4, the wireless communication method may include the following steps:

In step 401, the receiving device receives a signal sent by the transmitting device.

In one embodiment, the received signal sent by the receiving device may be expressed as:

$$y_{i,1} = h_i x_{i,1} + n_{i,1}$$

$$y_{i,2} = h_i x_{i,2} + n_{i,2} \quad (1.7)$$

At this time, the SINR (signal-to-interference-plus-noise ratio) of the receiving device is, $$SINR_{Auth-SLO} = \frac{\|h_i\|^2(\alpha^2+\beta^2)}{2\sigma_n^2} = \gamma_i. \quad (1.6)$$

As may be seen from the above formulas, the superimposed tag signal does not sacrifice the SINR of the receiving device. At this time, for the receiving device, it is not necessary to estimate the channel parameter (channel fading); there is no need to compensate the channel; and the signal is not required to be demodulated and decoded either. The receiving device could authentic the received signal by determining whether the received signal accords with the power distribution characteristics of the transmitting device.

In step 402, the receiving device groups the signals according to a pre-agreed key, and calculates the power of each packet.

In this embodiment, the receiving device may determine a power allocation feature of the signal, that is, the power of each packet, according to a pre-agreed key.

The two packets described above are taken as an example, the power of the first packet is expressed as $\tau_{i,1} = y_{i,1}^H y_{i,1}/(L/2)$, the power of the second packet is expressed as $\tau_{i,2} = y_{i,2}^H y_{i,2}/(L/2)$, where $y_{i,1}^H$ is a conjugate transpose of $y_{i,1}$. $i$ is the sequence number of the received data block, and 1 is the signal corresponding to the first packet. Further, $$\tau_{i,1} = \frac{1}{L/2}(h_i x_{i,1} + n_{i,1})^H(h_i x_{i,1} + n_{i,1}) \quad (1.7)$$

$$= \frac{1}{L/2}\sum_{k=1}^{L/2}(\|h_i x_{i,1}(l_{1,k})\|^2 + \|n_{i,1}(l_{1,k})\|^2)$$

$$= \frac{1}{L/2}\sum_{k=1}^{L/2}(\|h_i \alpha s_i(l_{1,k})\|^2 + \|n_{i,1}(l_{1,k})\|^2),$$

$$\tau_{i,2} = \frac{1}{L/2}(h_i x_{i,2} + n_{i,2})^H(h_i x_{i,2} + n_{i,2}) \quad (1.8)$$

$$= \frac{1}{L/2}\sum_{k=1}^{L/2}(\|h_i x_{i,2}(l_{2,k})\|^2 + \|n_{i,2}(l_{2,k})\|^2)$$

$$= \frac{1}{L/2}\sum_{k=1}^{L/2}(\|h_i \alpha s_i(l_{1,k})\|^2 + \|n_{i,1}(l_{1,k})\|^2),$$

where $x_{i,1}$ and $n_{i,1}$ are independent of each other.

In Step 403, the receiving device may determine a test statistic according to the power of each packet.

In one embodiment, after determining the power of each packet, the receiving device may determine the test statistic according to the power of each packet.

Where the test statistic may be expressed as: $\tau_i = \tau_{i,1} - \tau_{i,2}$.

In Step 404, the receiving device may determine whether the test statistic is greater than or equal to a preset statistic threshold. If the test statistic is greater than or equal to a preset statistic threshold, go to step 405. If the test statistic is less than the preset statistic threshold, go to step 406.

In this embodiment, the statistic threshold for determining whether the signal is a regular signal or a tag signal may be obtained through a plurality of tests in advance, and the statistic threshold could be expressed as $\tau_i^0$.

In Step 405, the receiving device may determine that the signal is a tag signal, and end the process, where the tag signal is an authentication signal received by the receiving device.

In this embodiment, if the receiving device determines that the test statistic is greater than or equal to the preset statistic threshold, the signal may be determined to be a tag signal. In this case, the test statistic $\tau_i$ may be expressed as follows:

$$\tau_i | H_1 = \frac{1}{L/2}\sum_{k=1}^{L/2}\begin{pmatrix} \|h_i \alpha s_i(l_{1,k})\|^2 - \|h_i \beta \rho_s s_i(l_{2,k})\|^2 + \\ \|n_{i,1}(l_{1,k})\|^2 - \|n_{i,2}(l_{2,k})\|^2 \end{pmatrix} \quad (1.9)$$

$$= \frac{1}{L/2}\sum_{k=1}^{L/2}\begin{bmatrix} \|h_i\|^2(\alpha^2\|s_i(l_{1,k})\|^2 - \beta^2\|s_i(l_{2,k})\|^2) + \\ \|n_{i,1}(l_{1,k})\|^2 - \|n_{i,2}(l_{2,k})\|^2 \end{bmatrix}$$

In Step 406, the receiving device may determine that the signal is a regular signal, where the regular signal is a non-authentication signal received by the receiving device.

In this embodiment, if the receiving device determines that the test statistic is less than the preset statistic threshold, the signal may be determined to be a regular signal. In this case, the test statistic $\tau_i$ may be expressed as follows:

$$\tau_i | H_0 = \frac{1}{L/2}\sum_{k=1}^{L/2}(\|n_{i,1}(l_{1,k})\|^2 - \|n_{i,2}(l_{2,k})\|^2), \quad (1.10)$$

such that this authentication technology may be referred to as a slope authentication technology (Auth-SLO).

In the method shown in FIG. 4, the receiving device may use the key agreed by the two parties to identify whether the received signal satisfies the power allocation feature to achieve the purpose of information authentication. The hostility user could not obtain the position information of the power modification during the whole process of signal transmission and reception, thereby the security of the information transmission could be improved.

Figure 5:
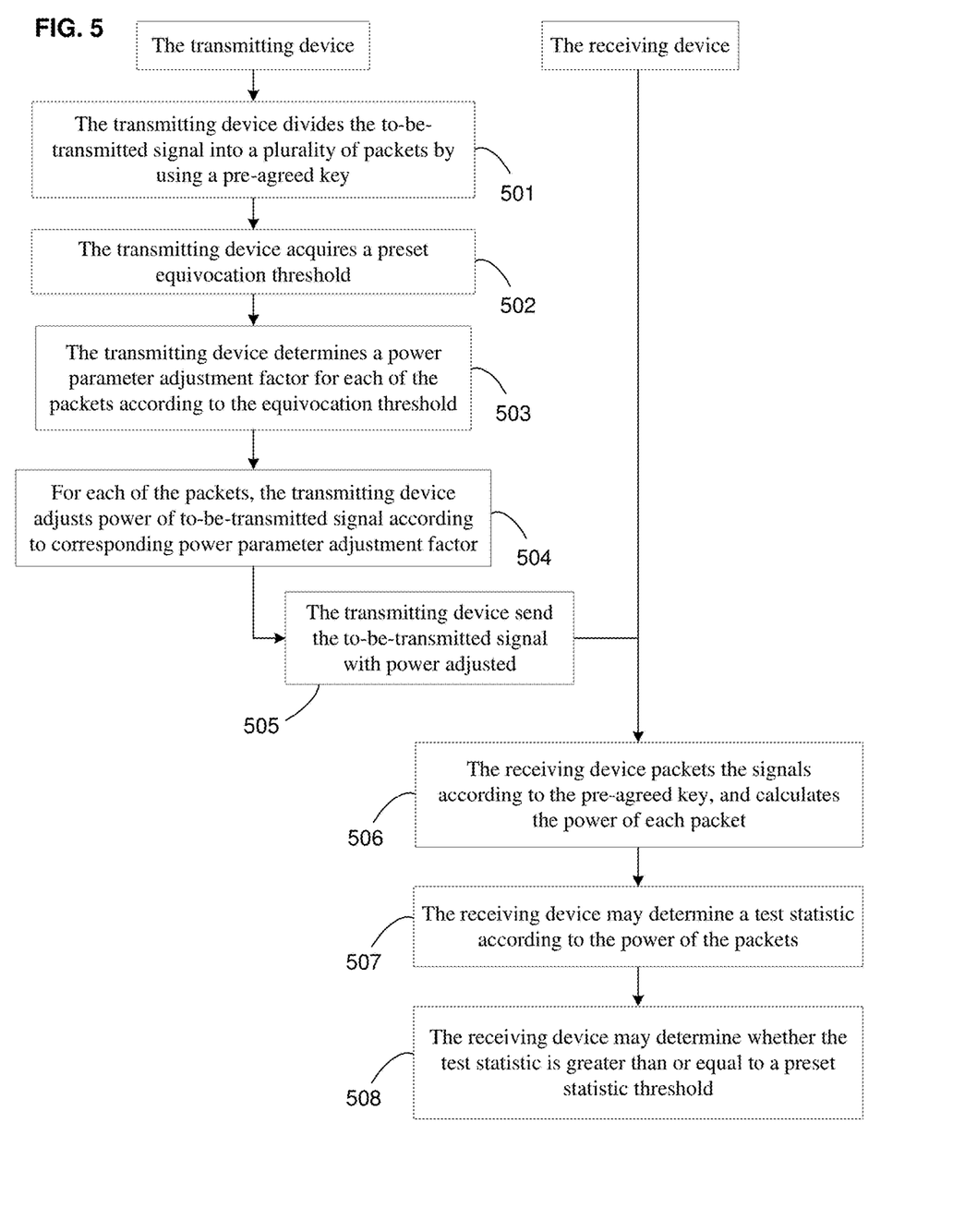
FIG. 5 is a schematic flowchart of a wireless communication method according to some embodiments.

Referring to FIG. 5, FIG. 5 is a schematic flowchart diagram of an another wireless communication method according to an embodiment. The wireless communication method is described for a combined system of both the transmitting device and the receiving device. As shown in FIG. 5, the wireless communication method may include the following steps:

In step 501, the transmitting device divides the to-be-transmitted signal into a plurality of packets by using a pre-agreed key.

In step 502, the transmitting device acquires a preset equivocation threshold. In step 503, the transmitting device determines a power parameter adjustment factor for each of the packets according to the equivocation threshold.

In step 504, for each of the packets, the transmitting device adjusts the power of to-be-transmitted signal according to corresponding power parameter adjustment factor.

In Step 505, the transmitting device sends the to-be-transmitted signal with power adjusted. In Step 506, the receiving device groups the signals according to the pre-agreed key, and calculates the power of each packet.

In Step 507 the receiving device may determine a test statistic according to the power of each of the packets.

In Step 508, the receiving device may determine whether the test statistic is greater than or equal to a preset statistic threshold. If the test statistic is greater than or equal to the preset statistic threshold, the receiving device determines that the signal is a tag signal; and if the test statistic is less than the preset statistic threshold, the receiving end device determines that the signal is a regular signal.

Figure 6:
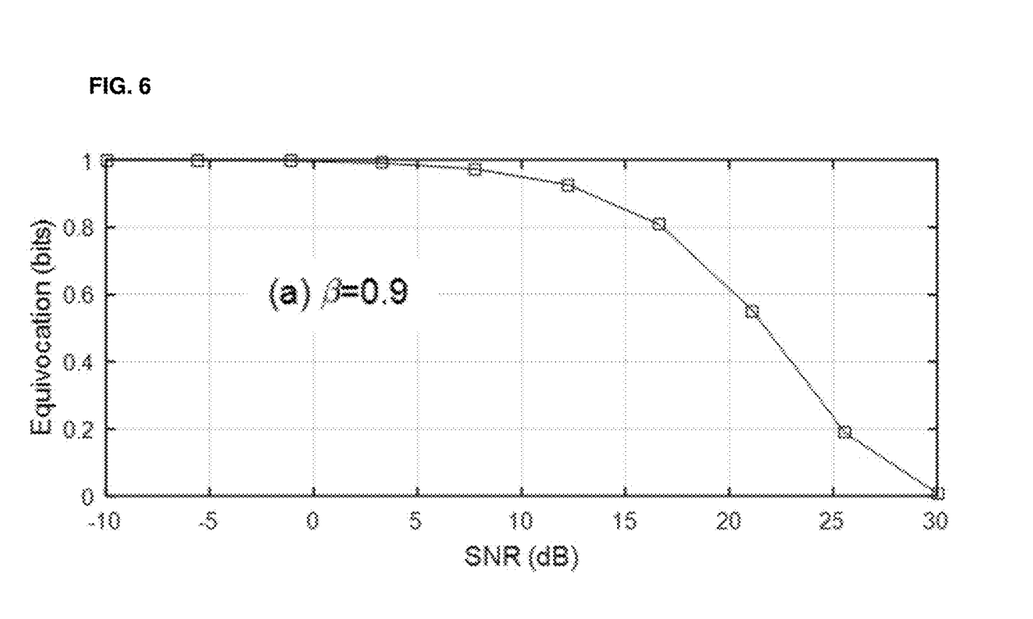
FIG. 6 is a schematic diagram of a equivocation change curve regarding a signal to noise ratio according to some embodiments.
Figure 7:
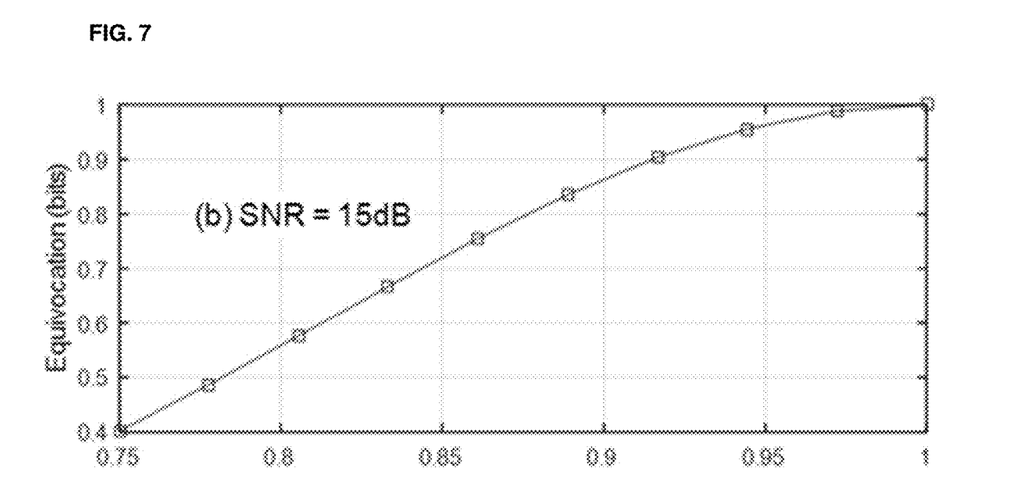
FIG. 7 is a schematic diagram of a equivocation change curve of with respect to a power parameter adjustment factor according to some embodiments.

Please refer to FIG. 6 and FIG. 7 together. FIG. 6 is a schematic diagram showing a change curve of the equivocation to the signal to noise ratio according to one embodiment. FIG. 7 is a schematic diagram showing a change curve of the equivocation to the power parameter adjustment factor according to one embodiment. In FIG. 6, β=0.9, where β is the power parameter adjustment factor used to add the tag signal; and in FIG. 7, SNR=15 dB. As may be seen from FIG. 6, if β=0.9, the equivocation may gradually change from 1 to 0 as the values of SNR increases, and a turning point is at SNR=3 dB. As may be seen from FIG. 7, if SNR=15 dB, the equivocation may gradually increase from 0.4 to 1 as the value of f increases. Therefore, under a certain wireless communication environment, in order to ensure the security of information transmission, the transmitting device should increase the value of f as much as possible when performing power adjustment.

Compared with the existing wireless communication physical layer authentication technologies (Auth-SS, Auth-SUP, Auth-TDM), using the Auth-SLO authentication technology described above, the wireless communication physical layer may be authenticated without occupying additional signal bandwidth. At the same time, the tag signal does not affect noise extraction and noise statistical characteristics in the receiving device. In addition, the security of the Auth-SLO authentication technology described herein is higher than that of the prior art, both in terms of spectrum characteristics analysis and impact on other users in the communication scenario.

In the method described in FIG. 5, before transmitting the to-be-transmitted signal, the transmitting device may use the key agreed by the two parties to divide the transmitted signals into multiple packets, and use the determined power parameter adjustment factor to adjust the signal power of each packets. At the same time, the receiving device may also use the key agreed by the two parties to identify whether the received signal satisfies the power allocation feature of the signal transmitted by the transmitting device to achieve the purpose of information authentication. Then, the signal is transmitted, and the hostile user 3 cannot obtain the position information of the power modification during the whole information transmission, whereby the security of the information transmission may be improved.

Figure 8:
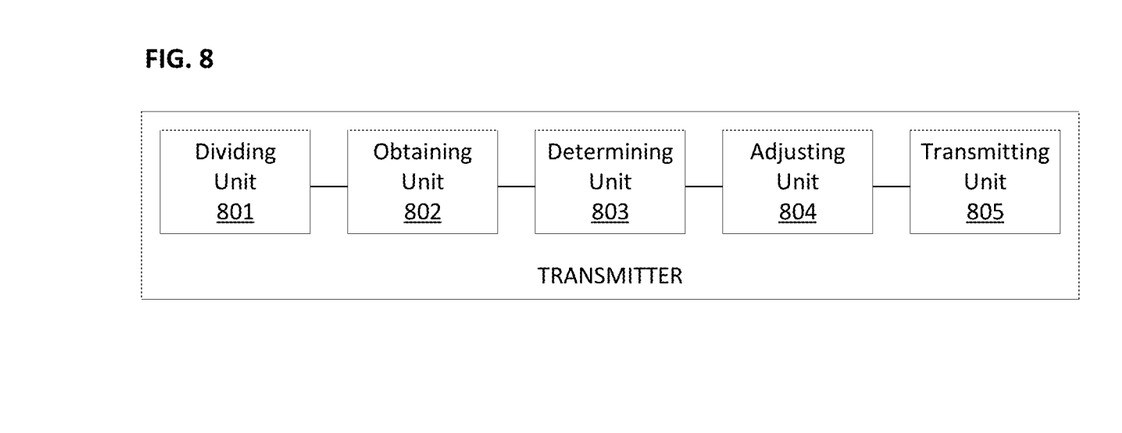
FIG. 8 is a schematic structural diagram of a transmitter in a wireless communication apparatus according to some embodiments.

Please refer to FIG. 8. FIG. 8 is a schematic structural diagram of a wireless communication apparatus according to one embodiment, in which the wireless communication apparatus runs on the transmitting device. The wireless communication apparatus described in FIG. 8 may perform some or all of the steps in the wireless communication method described in FIG. 2 and FIG. 5. As shown in FIG. 8, the wireless communication apparatus may include:

A dividing unit 801, to divide the to-be-transmitted signal into multiple packets by using a pre-agreed key; an obtaining unit 802, which obtains a preset threshold of the equivocation; a determining unit 803, according to the equivocation threshold, which determines a power parameter adjustment factor for each of the packets; an adjusting unit 804, which adjusts the power of the signal of the packet according to a power parameter adjustment factor of the packet for each of the packets; and a transmitting unit 805, which sends the to-be-transmitted signal with the power adjusted.

Optionally, using the determining unit 803, the power parameter adjustment factor of each of the packets may be determined according to the equivocation threshold, specifically by: determining a first power parameter adjustment factor according to the equivocation threshold; and determining the other power parameter adjustment factors other than the first power parameter adjustment factor according to the first power parameter adjustment factor and the energy-limited condition of the to-be-transmitted signal power.

Optionally, the determining unit 803 may further be configured to determine the equivocation threshold according to a condition that the power modified location information is not obtained.

In the wireless communication apparatus described in FIG. 8, before transmitting the to-be-transmitted signal, the transmitting device may use the key agreed by the two parties to divide the transmitted signals into multiple packets, and use the determined power parameter adjustment factor to adjust the signal power of each packets. Then, the signal is transmitted, and the hostile user 3 cannot obtain the position information of the power modification during the whole information transmission, whereby the security of the information transmission may be improved.

Figure 9:
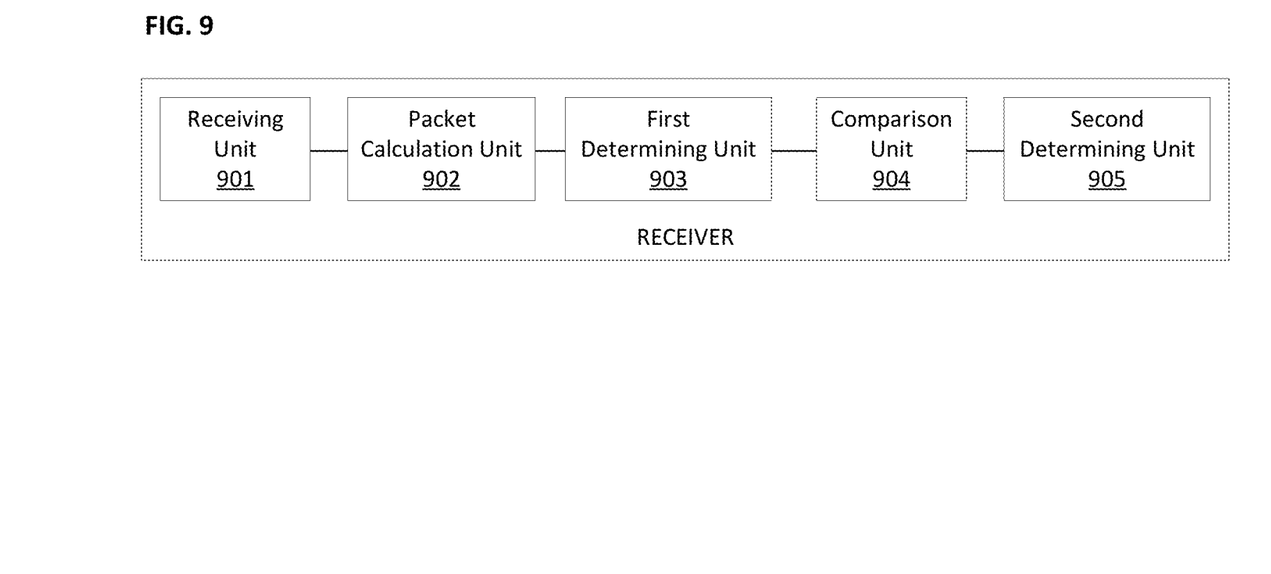
FIG. 9 is a schematic structural diagram of a receiver in a wireless communication apparatus according to some embodiments.

Please refer to FIG. 9. FIG. 9 is a schematic structural diagram of another wireless communication apparatus according to an embodiment. The wireless communication apparatus shown in FIG. 9 may be applied in a receiving device. The wireless communication apparatus described in FIG. 9 may perform some or all of the steps in the wireless communication method described in FIG. 4 and FIG. 5. As shown in FIG. 9, the wireless communication apparatus may include:

A receiving unit 901 receive a signal sent by the transmitting device; a packet calculation unit 902, which groups the signals according to a pre-agreed key, and calculates powers for each packet; a first determining unit 903, which determines a test statistic according to the power of each of the packets; a comparison unit 904, which checks whether the test statistic is greater than or equal to a preset statistic threshold; a second determining unit 905, which determines that the signal is a tag signal if the comparison unit 904 determines that the test statistic is greater than or equal to a preset statistic threshold. The tag signal is an authentication signal received by the receiving device. The second determining unit 905 may further determine that the signal is a regular signal if the comparison unit 904 determines that the test statistic is less than the statistic threshold. The regular signal is a non-authentication signal received by the receiving device.

In the wireless communication apparatus described in FIG. 9, the pre-agreed key may be used to identify whether the received signal satisfies the power allocation feature. During the whole process of signal transmission and reception, the signal is transmitted, and the hostile user cannot obtain the position information of the power modification during the whole information transmission, thereby the security of the information transmission could be improved.

The above-described integrated unit implemented in the form of a software function module may be stored in a computer readable storage medium, which may store a computer program, which, when executed by a processor, may implement the steps in the foregoing various method embodiments. The computer program comprises computer program code, which may be in the form of source code, object code form, executable file or some intermediate form. The computer readable storage medium may include any entity or device capable of carrying the computer program code, a recording medium, a USB flash drive, a removable hard disk, a magnetic disk, an optical disk, a computer memory, a read only memory (ROM, Read-Only Memory), random access memory (RAM, Random-Access Memory), electrical carrier signals, telecommunications signals, and software distribution media. It should be noted that the content contained in the computer readable storage medium may be appropriately increased or decreased according to the requirements of legislation and patent practice in a jurisdiction.

In the above embodiments, the descriptions of the various embodiments are all focused on, and the parts that are not detailed in a certain embodiment may be referred to the related descriptions of other embodiments.

In the several embodiments provided herein, it should be understood that the disclosed apparatus may be implemented in other ways. For example, the device embodiments described above are merely illustrative. For example, the division of the unit is only a logical function division, and the actual implementation may have another division manner. For example, multiple units or components may be combined or integrated into another system, or some features may be omitted or not implemented. In addition, the coupling or direct coupling or communication connection shown or discussed may be an indirect coupling or communication connection through some interface, device or unit, and may be electrical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of an embodiment.

In addition, each functional unit in each embodiment may be integrated into one processing unit, or each unit may exist physically separately, or two or more units may be integrated into one unit. The above integrated unit may be implemented in the form of hardware or in the form of a software functional unit.

The integrated unit, if implemented in the form of a software functional unit and sold or used as a standalone product, may be stored in a computer readable memory. Based on such understanding, the technical solution of the disclosure may contribute to the prior art or all or part of the technical solution may be embodied in the form of a software product. The computer software product is stored in a memory and includes instructions for causing a computer device (which may be a personal computer, server or network device, etc.) to perform all or part of the steps of the methods described in various embodiments of the disclosure. The foregoing memory includes: a U disk, a Read-Only Memory (ROM), a Random Access Memory (RAM), a removable hard disk, a magnetic disk, or an optical disk, and the like, which may store program codes.

One of ordinary skill in the art will appreciate that all or part of the various steps of the above-described embodiments may be accomplished by a program instructing the associated hardware. The program may be stored in a computer readable memory, and the memory may include: a flash disk, a read-only memory (ROM), a random access memory (RAM), disk or CD, etc.

The wireless communication method and apparatus described for the various embodiments are described in detail above. The principles and embodiments of the disclosure have been described herein with reference to specific examples, and the description of the above embodiments is only to assist in understanding the method of the disclosure and its core idea. At the same time, for the general technician in this field, there will be some changes in the specific implementation and application scope according to the idea of this disclosure. In summary, the contents of this specification should not be understood as a limitation to the disclosure.

What is claimed is:

1. A wireless communication method, used in a receiving device, comprising:
    a) receiving a signal sent by a transmitting device;
    b) dividing the signals into multiple packets according to a pre-agreed key;
    c) calculating a power of each of the packets;
    d) calculating a test statistic based on the power of each packet;
    e) determining whether the test statistic is greater than or equal to a preset statistic threshold;
    f) if the test statistic is greater than or equal to the preset statistic threshold, setting the signal as a tag signal, wherein the tag signal is an authentication signal received by the receiving device.

2. The method of claim 1, wherein the method further comprises:
    if the test statistic is less than the statistic threshold, setting the signal as a regular signal, wherein the regular signal is a non-authentication signal received by the receiving device.

* * * * *